United States Patent [19]

Ravizza

[11] Patent Number: 4,481,544
[45] Date of Patent: Nov. 6, 1984

[54] AUTOMATIC TRACKING SYSTEM WITH APPARATUS TO PREVENT MISTRACKING BY A LIMITED RANGE TRANSDUCER DURING STOP MOTION

[75] Inventor: Raymond F. Ravizza, Cupertino, Calif.

[73] Assignee: Ampex Corporation, Redwood City, Calif.

[21] Appl. No.: 303,642

[22] Filed: Sep. 18, 1981

[51] Int. Cl.³ .................... H04N 5/78; G11B 21/10
[52] U.S. Cl. ............................. 360/10.2; 360/10.3; 360/77; 360/78
[58] Field of Search ................. 360/10.1–10.3, 360/70, 73–78, 107, 109, 84

[56] References Cited

U.S. PATENT DOCUMENTS

| | | | |
|---|---|---|---|
| 4,163,993 | 8/1979 | Ravizza | 360/77 |
| 4,287,538 | 9/1981 | Sakamoto et al. | 360/10.2 |
| 4,319,289 | 3/1982 | Ravizza . | |
| 4,361,857 | 11/1982 | Sakamoto | 360/10.2 |
| 4,370,685 | 1/1983 | Hosoi et al. . | |

FOREIGN PATENT DOCUMENTS

0037738 10/1981 European Pat. Off. .

Primary Examiner—Raymond F. Cardillo, Jr.
Attorney, Agent, or Firm—Ralph L. Mossino; Joel D. Talcott

[57] ABSTRACT

Apparatus is disclosed for providing full frame reproduction, i.e., the reproducing of two consecutive video fields, during a still frame or stop action mode in a recording and reproducing apparatus of the type which utilizes transverse positioning of the transducing head to accurately follow a track during reproducing, and at the completion of the reproduction from the track, to properly position the head to either reproduce the next desired track or to again reproduce the same track. The present invention has the capability of reproducing two consecutive fields to obtain full frame picture resolution in the video display in the manner whereby the transducing head which is carried by a movable element is maintained relatively centered within its dynamic range so as to minimize the possibility of picture break-up due to mistracking.

27 Claims, 9 Drawing Figures

AUTOMATIC TRACKING SYSTEM WITH APPARATUS TO PREVENT MISTRACKING BY A LIMITED RANGE TRANSDUCER DURING STOP MOTION

The present invention generally relates to magnetic recording and reproducing apparatus, and more specifically to improvements in recording and reproducing apparatus of the type which achieve time base reference alteration reproducing effects.

In my U.S. Pat. No. 4,163,993, issued Aug. 7, 1979 and entitled "Continuous Slow Motion Automatic Tracking System", there is apparatus disclosed which achieves signal time base reference alteration effects, such as slow motion, stop motion and fast motion reproducing. In that patent, there are cross references made to many other patents and applications which generally relate to different aspects of apparatus that accomplishes such alteration effects. The present invention relates to improvements in reproducing time base alteration effects suitable for use in the system disclosed in the aforementioned patent, particularly for achieving still frame (sometimes referred to as stop motion) reproducing. While the systems disclosed in the aforementioned patent and cross-referenced applications and patents are not limited to helical wrap recording and reproducing apparatus, they are particularly adapted for such type of apparatus and the present invention is similar in that regard. The apparatus disclosed in the aforementioned patent and cross-referenced applications employs a movable element that moves the transducing head transversely relative to the longitudinal direction of the tracks so that the head follows selected tracks along the magnetic tape, and thereafter selectively alters or changes the position of the head after the head completes the scan of a selected track to correctly position the head to commence following another track. In the event the head is to follow the next adjacent later recorded track, the head would be in the correct position to begin following it at the completion of the scan of a previously selected track. It should be understood that one complete revolution of the transducing head causes the head to scan a track at a predetermined angular orientation relative to the length of the tape and, at the end of the revolution, the movement of the tape causes the head to be displaced a predetermined distance in position to begin scanning the next adjacent track. During recording operations, the head records information along tracks that are parallel to one another, and assuming the transport speed of the tape and the speed of rotation of the scanning head are maintained constant, the tracks will have a constant spacing relative to adjacent tracks, i.e., the center-to-center distance between adjacent tracks will be substantially constant in the absence of geometric errors.

Geometric errors are introduced by temperature or humidity induced dimensional changes of the tape, by faulty tensioning mechanism in the tape transport to cause the stretching of the tape, or by imperfect control of the relative head to tape speed. During normal speed playback operations, i.e, when the tape is being moved and the head is being rotated at the same speeds as they were during the recording operation, the scanning head will follow a track during a single revolution and be in position to begin following the next adjacent track during the next revolution. Furthermore, each track will be followed once and produce unaltered time base effects as would be expected, such as normal speed visual effects of recorded video information.

In the event it is desired to produce a still frame or stop motion effect, the transport of the tape is stopped and one recorded track is typically repeated indefinitely. In this mode of operation, the transducing head will be continuously deflected to follow the track from beginning to end, and at the end, the head will be reset in the direction opposite the direction it has been deflected to position it at the beginning of the same track. The distance that the head is deflected from its normal path as it scans the track, and the distance it is subsequently reset, is equal to the spacing between the centers of adjacent tracks (also referred herein as a track-to-track spacing or distance). Thus, by continuously deflecting the head to follow a track, resetting the head and deflecting the head again to follow the same track, a single field is repetitively reproduced, thereby permitting the stop motion or still frame visual picture to be displayed. This operation as well as other special effect reproducing modes are described in the aforementioned Ravizza U.S. Pat. No. 4,163,993 and also in Hathaway et al. application, Ser. No. 677,815, also cross-referenced in the aforementioned Ravizza patent.

Since each track contains one field of recorded video information, resetting the head to reproduce a single track during still frame operation results in a single field being reproduced indefinitely. Repetitively reproducing a single field may be appropriate when a video image is a fast changing one where subsequent fields contain a video image that is slightly different from the one in the preceding field. However, a single field obviously does not contain the full television frame of information (525 lines of information for the NTSC format; 625 lines for the PAL and SECAM formats) and therefore has less resolution than a full frame of information which contains two fields of information. Where the image represented by the recorded information is relatively slow changing or unchanging from field to field, as in a truly still image, it is desirable to increase the resolution of the reproduced still image and in such instances, it is desirable to reproduce two consecutive fields of information. As described in the aforementioned patent, such still image reproduction is accomplished in a specific way. As is fully disclosed therein, the resetting of the transducing head is accomplished by level detectors, which effectively monitor the position of the head relative to a nominal or home position (which in the aforementioned patent represents a position where the movable element is undeflected), together with a reset trigger pulse when generator, supplies a pulse that resets the head if the position of the head is detected by the level detector to be beyond a certain level. Thus, when the reset trigger pulse occurs and the head is deflected beyond a certain level or position, then the resetting of the movable element occurs to place the transducing head in position to replay the track. Since the reset trigger is obtained from a tachometer and occurs once each revolution of the scanning head, it should be appreciated that resetting can occur each revolution, i.e., at the completion of reproducing from each track.

One of the embodiments described in the aforementioned patent permits a full television frame of information to be reproduced during still frame reproducing mode. In such embodiment, the level detectors are essentially unchanged, but the reset trigger pulse frequency is divided by two so that it occurs only once every other revolution, which enables the apparatus to follow two consecutive tracks before it is reset. While this can properly reproduce the desired still image much of the time, there are problems associated with this approach which will be more fully described hereinafter, but which essentially result from the fact that the dynamic range of the movable element may be somewhat restricted, i.e., on the order of approximately three track-to-track spacings.

In certain instances when the tape transport stops the tape to switch to still frame reproducing, the position of the tracks relative to element carrying the the movable element carrying the transducing head may be such that a full frame scan will exceed the dynamic deflecting range of the head in a particular direction. When this occurs, the movable element will not deflect further in response to the applied drive signal and the carried transducing head mistracks, i.e., it will no longer be centered or even be on the recorded track. The result of the mistracking is undesirable picture break-up of the video image and this condition can remain until the servo circuit controlling the movable element accidentally recenters itself onto another pair of tracks, or is aided in recentering by slightly moving the tape to bring the pair of tracks it is trying to follow back into the linear range of the movable element carrying the transducing head. However, to require an operator to manually move the tape represents an unacceptable operational nuisance which is incompatible with the operational quality that is demanded by many users and manufacturers.

Accordingly, it is an object of the present invention to provide an improved apparatus for reproducing two consecutive fields in an apparatus of the foregoing type to thereby obtain full frame resolution in a manner whereby the movable element carrying the transducing head is maintained in a relatively centered portion of its dynamic range.

Another object of the present invention is to provide an improved apparatus of the foregoing type which automatically positions the movable element carrying the transducing head in a relatively centered portion of its dynamic range to thereby substantially eliminate any mistracking that can occur due to the movable element exceeding its dynamic range.

Yet another object of the present invention is to provide an apparatus of the foregoing type which is disturbance free when switched by an opertor between a full frame, i.e., two consecutive fields, reproducing mode and a single field reproducing mode.

Still another object of the present invention is to provide an apparatus that facilitates the synchronous reproduction of time base altered effects with minimum disturbance from television signals recorded on a magnetic tape along a plurality of adjacent tracks.

Other objects and advantages will become apparent upon reading the following detailed description of the present invention while referring to the attached drawings, in which:

Figure 6A:
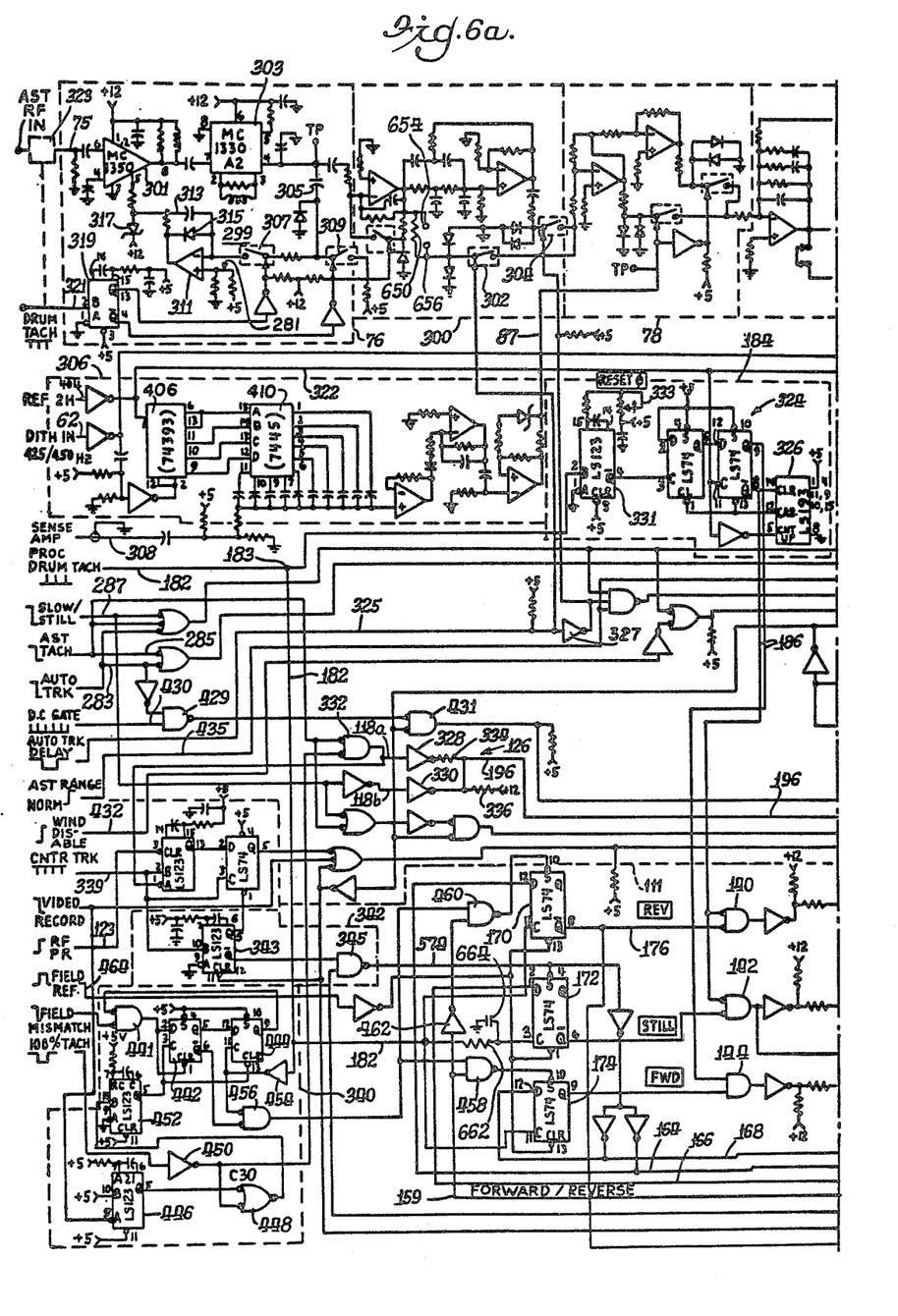
FIGS. 6a and 6b together illustrate an electrical schematic diagram illustrating circuitry that may be used to carry out the operation of the block diagram of FIG. 1 as well as to generate the head deflection waveform shown in FIG. 5c when the apparatus is placed in the two field still frame reproducing mode.
Figure 6B:
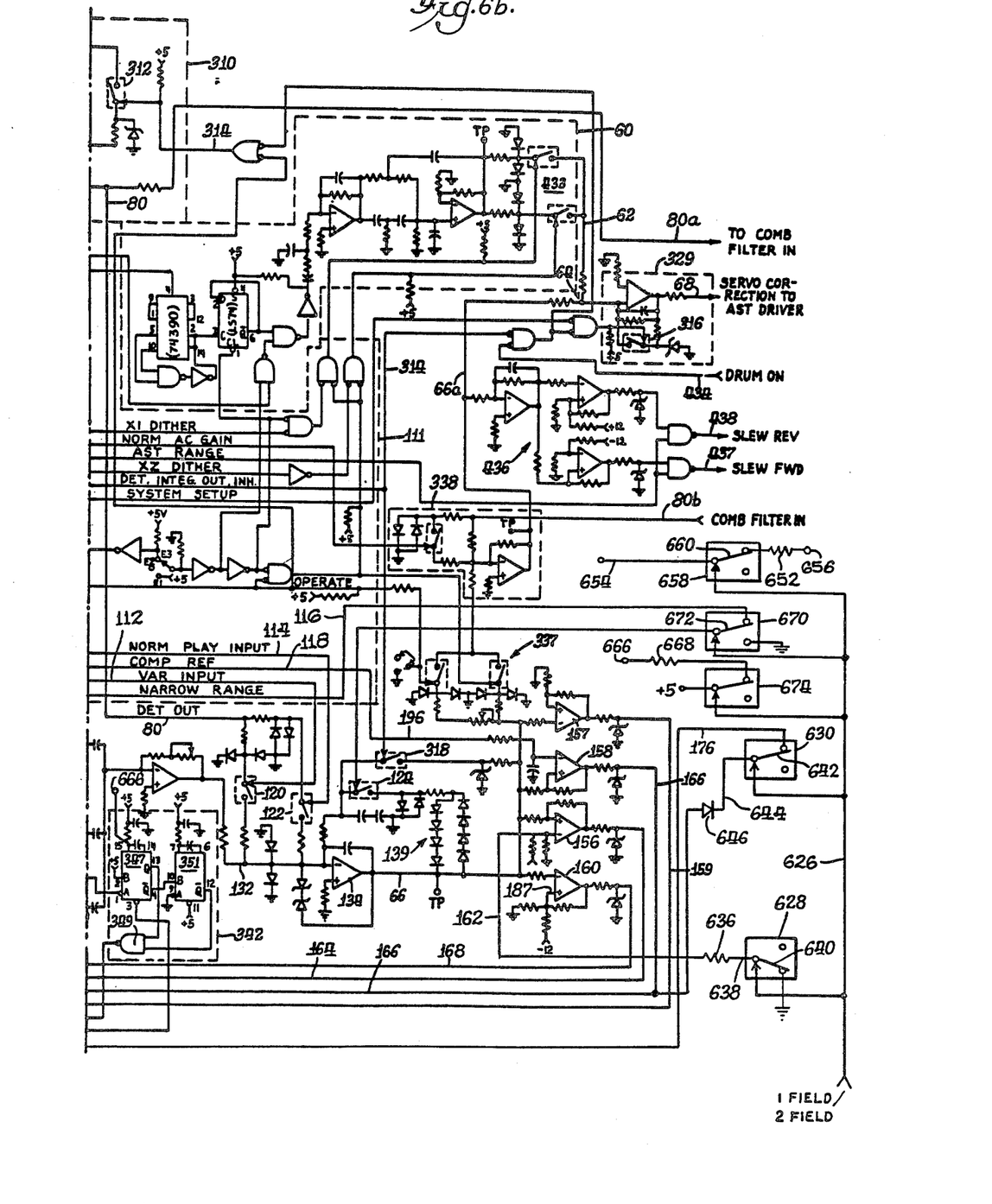

Before describing the method and apparatus that embodies the present invention, the environment in which the present invention can be utilized initially shall be broadly described so as to provide a better understanding of the present invention. While the aforementioned Hathaway et al. application Ser. No. 677,815, as well as Ravizza U.S. Pat. No. 4,151,570, comprehensively set forth the background and the environment to which the present invention can be applied, a brief description of that environment will be set forth herein. Also improvements to the aforementioned application and patent are comprehensively set forth in the aforementioned Ravizza U.S. Pat. No. 4,163,993, which also provides additional environments for which the present invention can be utilized. To this end, FIGS. 6a and 6b contain the detailed circuitry that is taken from the aforementioned Ravizza U.S. Pat. No. 4,163,993 and the reference numbers associated with this drawing are maintained where they identify identical circuit components from the prior Ravizza U.S. Pat. No. 4,163,993. The text of that patent is specifically incorporated by reference herein to eliminate the necessity for describing the detailed operation of the bulk of the circuitry. However, it should be understood that where the circuitry of FIGS. 6a and 6b is modified to practice the present invention, such portions of the circuitry will be described in detail herein.

While the present invention is particularly adapted for use with helical scan types of video tape recorders, it should be understood that the present invention is not limited to helical recorders and may be used with quadrature, segmented helical, arcuate and other types of rotary scan video tape recorders. In addition, the present invention is suited for use with various tape recording formats characteristic of the various rotary scan tape recorders. Furthermore, the present invention is not limited to use with rotary scan tape recorders designed for processing video signals. It is contemplated that the present invention will find utility in any application where it is desired to record or reproduce, i.e., transfer information with respect to a tape recording medium, without the introduction of transients into the transferred information while the relative head to tape speed undergoes changes.

Figure 2:
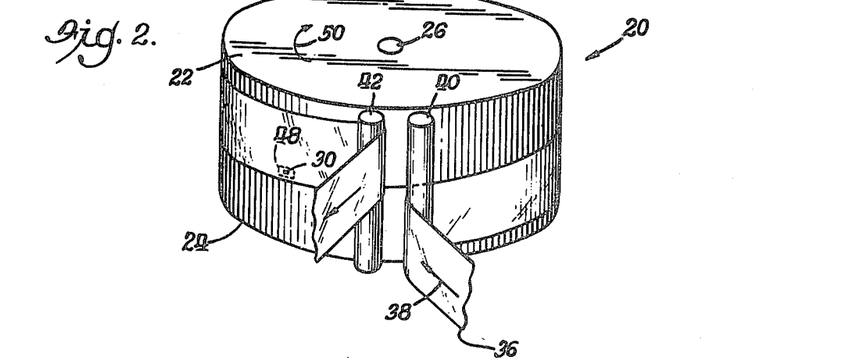
FIG. 2 is a perspective view of the helical tape guide and scanning head assembly portion of an omega wrap helical scan recording and/or reproducing apparatus which is simplified for the sake of clarity and which can be used together with the present invention.
Figure 3:
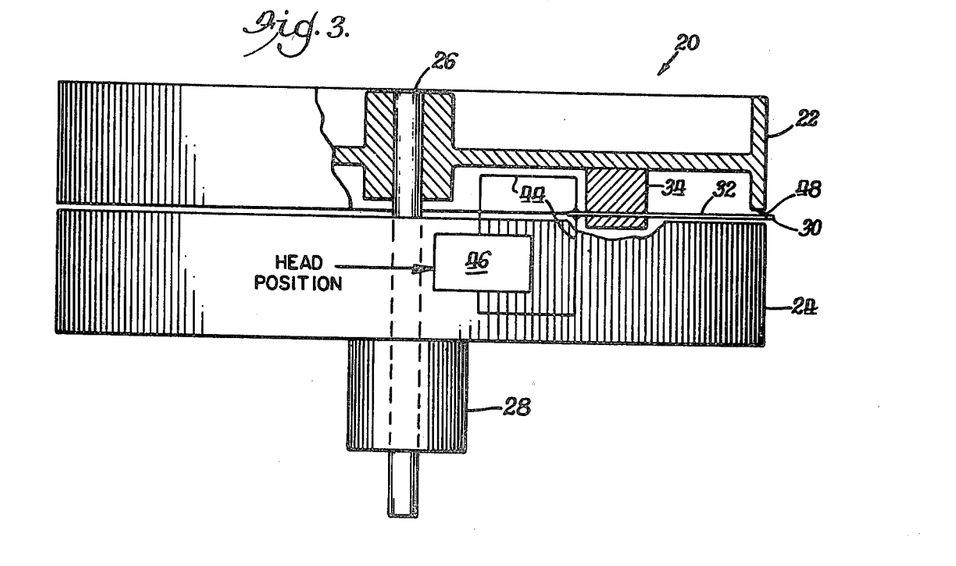
FIG. 3 is a side elevation of the drum tape guide and scanning head assembly shown in FIG. 2.

Turning now to the drawings, and particularly FIGS. 2 and 3, there is shown a helical video scanning head and cylindrical tape guide drum assembly indicated generally at 20, with FIG. 3 showing portions broken away. The drum-head assembly 20 is shown to comprise a rotatable upper drum portion 22 and a stationary lower drum portion 24, the upper drum portion 22 being fixed to a shaft 26 which is rotatably journaled in a bearing 28 that is mounted on the lower drum 24, the shaft 26 being driven by a motor (not shown) operatively connected thereto in a conventional manner. The drum-head assembly 20 has a video transducing head 30 and mounted on an elongated movable support element 32 that is in turn mounted at one end in a cantilevered type support 34 that is fixed to the upper drum portion 22. The element 32 is preferably of the type that flexes or bends in a direction transversely of the recorded track with the amount and direction of flexing or bending being a function of the electrical signals that are applied to it.

As is best shown in FIG. 2, the drum-head assembly 20 is part of a helical omega wrap video tape recorder which has the magnetic tape 36 advancing toward the lower drum 24 in the direction of the arrow 38 as shown when transported in the forward direction. More specifically, the tape is introduced to the drum surface from the lower right as is shown in the drawing and is passed around the guide post 40 which brings the tape into contact with the outer surface of the stationary lower drum support 24. The tape travels substantially completely around the cylindrical tape guide and passes around a second guide post 42, which changes the direction of the tape as its exits the drum-head assembly 20.

As is best shown in FIG. 2, the configuration of the tape path is such that the tape 36 does not contact the guiding drum surface over a full 360° rotation because of the clearance that is required for entrance and exit of the tape. This gap preferably does not exceed a drum angle of more than about 16°, but has the effect of creating a drop-out interval of information. In the case of recording video information, the occurrence of the drop-out is preferably chosen relative to the video information being recorded so that the information that is lost does not occur during the active portion of the video signal, and in the case of recording and reproducing video signals, so that the start of a scan of a track can be properly field synchronized to the video signal.

The transducing head 30 is mounted upon the elongated movable, preferably flexible, element 32 which may comprise an elongated two layer element that exhibits dimensional changes in the presence of an electric or magnetic field. The flexible, movable element 32 effectively moves the transducing head 30 mounted thereon in a vertical direction as shown in FIG. 3 in accordance with the electrical signals that are applied through conductors 44 from the automatic head tracking servo circuitry schematically illustrated by a block 46. The head 30 is mounted to extend slightly beyond the outer surface of the rotating drum portion 22, the head extending through an opening 48 in the outer surface thereof. The movable element 32 is adapted to sweep or bend and displace the transducing head along a path that is transverse to the direction of relative movement of the head 30 with respect to the magnetic tape 36, i.e., transverse to the direction of the recorded tracks.

If the transport speed of the magnetic tape 36 is changed for reproducing from that used for recording, head positioning error correcting signals will be produced for the purpose of having the transducing head follow the track of recorded information which is at the different angle. Since the movable element 32 is movable in either direction, the tape can be transported around the tape guide drum 22, 24, at either a faster or slower speed for reproducing relative to the recording speed and the movable element can position the head 30 to follow the recorded track for either condition.

Figure 4:
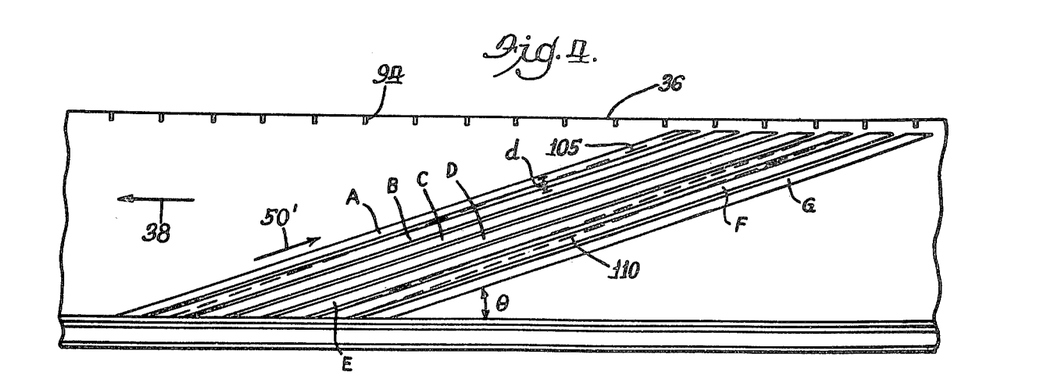
FIG. 4 is a pictorial view of an enlarged segment of magnetic tape having tracks A-G recorded thereon.

Referring to FIG. 4, there is illustrated a segment of magnetic tape 36 having a number of tracks A–G thereon recorded by the transducing head 30 as the tape is transported about the drum-head assembly 20 shown in FIG. 2. The segment of the tape is shown to have an arrow 38, which illustrates the direction of tape movement around the drum, and an arrow 50, which shows the direction of scanning head movement relative to the tape. Thus, when the upper drum portion 22 rotates in the direction of the arrow 50' (FIG. 2), the transducing head 30 moves along the tape in the direction of the arrow 50' shown in FIG. 4. With a constant transport speed of the tape and constant angular velocity of the rotating drum portion 22, tracks A–G will be substantially straight and parallel to one another at an angle $\theta$ (of about 3°, for example) relative to the longitudinal direction of the tape, with each rightward track shown in the drawing being successively produced during a recording operation. Since track B, for example, would be recorded immediately after track A was recorded during constant head rotation and tape transport speeds, it should be appreciated that if these speeds are maintained during the reproducing or playback operation, the transducing head 30 would play back track B during a successive revolution immediately after having reproducing information from track A.

If conditions were ideal and no tape transport disturbance was introduced, then the transducing head 30 would simply successively follow the adjacent tracks without adjustment, because no error signals would be produced for transversely moving the transducing head 30 relative to the track. Stated in other words, the transducing head is automatically in position to begin reproducing a subsequent track B after completing the reproducing of the information from track A. It should also be appreciated that if the tape transport speed varies during reproducing relative to the tape transport speed during recording, then the head must be transversely moved to maintain accurate tracking during reproduction. At the end of the scanning of a track, the head is nevertheless in the position to begin reproducing the next adjacent downstream track, i.e, track B, in the event reproduction of track A was completed. This occurs even when the tape is stopped or is traveling slower or faster than it was when the information was recorded on the tape.

To achieve special motion and other effects during reproduction of the information signals that are recorded on a tape, it is necessary to vary or adjust the transport speed of the tape past the location of the scanning head 30 and, hence, around the tape guide drum 22, 24 in the illustrated embodiment. To produce a speeded up or fast motion effect, the transport speed is increased during reproducing relative to that which was used during the recording process. Similarly, to produce slow motion effects, it is necessary to reduce the speed of the transport tape around the tape guide drum during the reproducing process relative to that which was used during the recording process. For reverse motion effects, the transport of the tape around the tape guide drum during reproducing operations is reversed relative to the transport direction during the recording operations and the reverse tape transport speed is set according to the desired reverse motion effect. In the stop motion or still frame motion modes, the tape is stopped during reproducing so that the rotating transducing head 30 can repetitively reproduce the signals.

When the transport of the tape is stopped the angle of the path followed by the head 30 relative to the tape 36 without head tracking control is different from the angle of the recorded tracks. Hence, the position of the head must be gradually adjusted in the axial direction of the drum-head assembly 20 through the course of reproducing the information signal from a track to maintain the head on the track during the one field still frame mode of operation. At the completion of the scan by every head of the track the position of the head 30 must be reset because the deflection of the transducing head will reach the predetermined threshold limits set for the displacement of the movable element 32. Since the transducing head 30 is deflected in the reverse direction relative to the direction of tape transport, the total deflection in the reverse direction being equal to the track center-to-track center spacing, d, of the recorded tracks, the head must be reset a corresponding distance in the opposite or forward direction at the completion of the scan of the track in order to be correctly positioned to rescan the same track. Thus, as the scanning head 30 moves along the track, head positioning error correcting signals are applied to the movable element 32 to cause it to be moved transversely to maintain head to track registry, and reset signals are applied to the movable element to reset the head in the opposite direction at the end of each scan of the track the distance, d, in order to position the head for beginning a rescan of the same track.

To maintain the transducing head 30 in registration with the track as it follows a track during revolution of the rotating drum portion 22, a servo circuit is used which produces an error correcting signal that is preferably a low frequency or changing D.C. level and is produced by apparatus such as disclosed in the aforementioned Ravizza U.S. Pat. No. 4,163,993. As the head 30 scans the track, the error signal causes the head to be adjusted so as to follow the track regardless of the speed of tape transport, provided it is within the limits of movement of the movable element 32.

Figure 1:
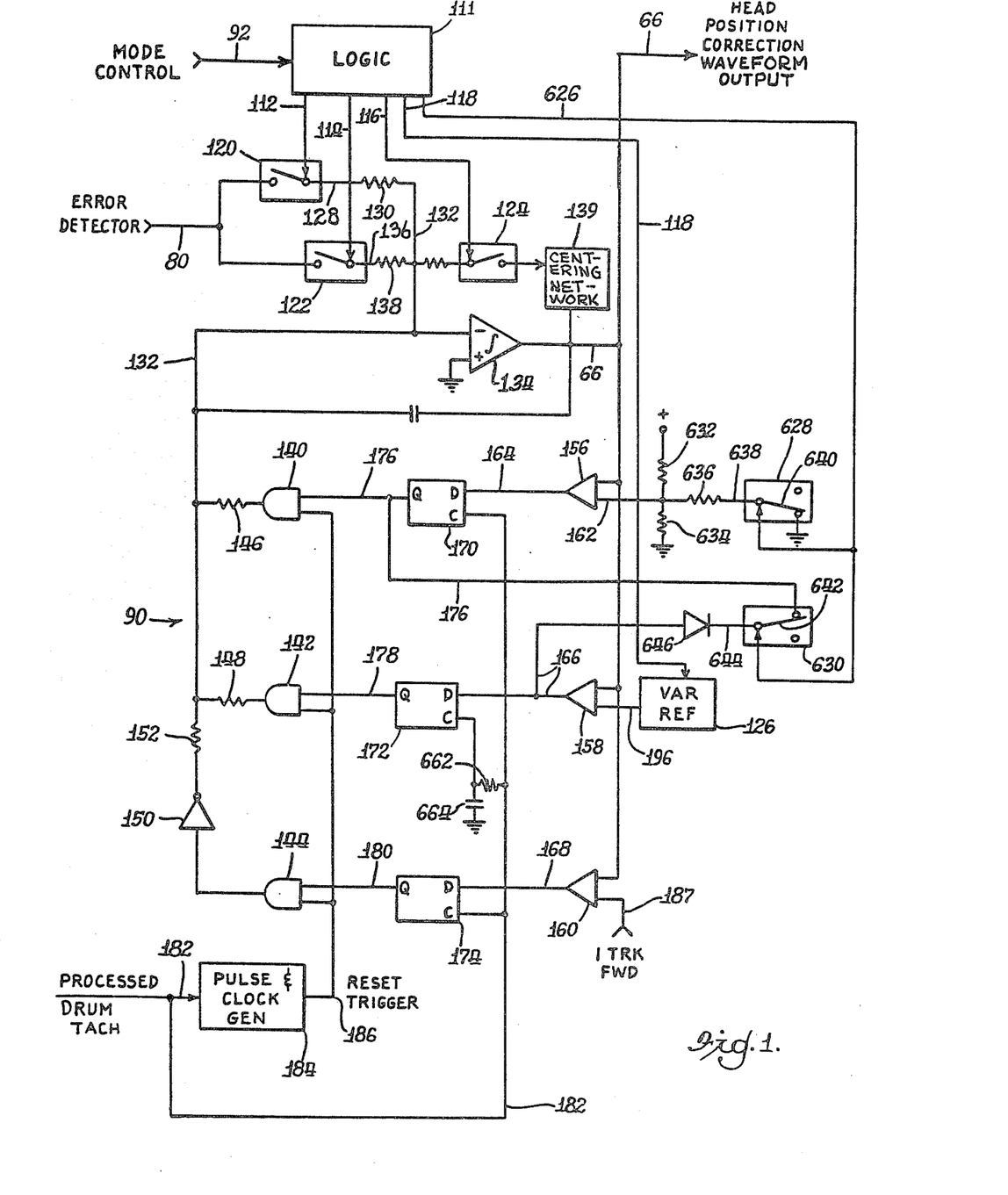
FIG. 1 is an electrical block diagram of circuitry embodying the present invention.
Figure 5A:
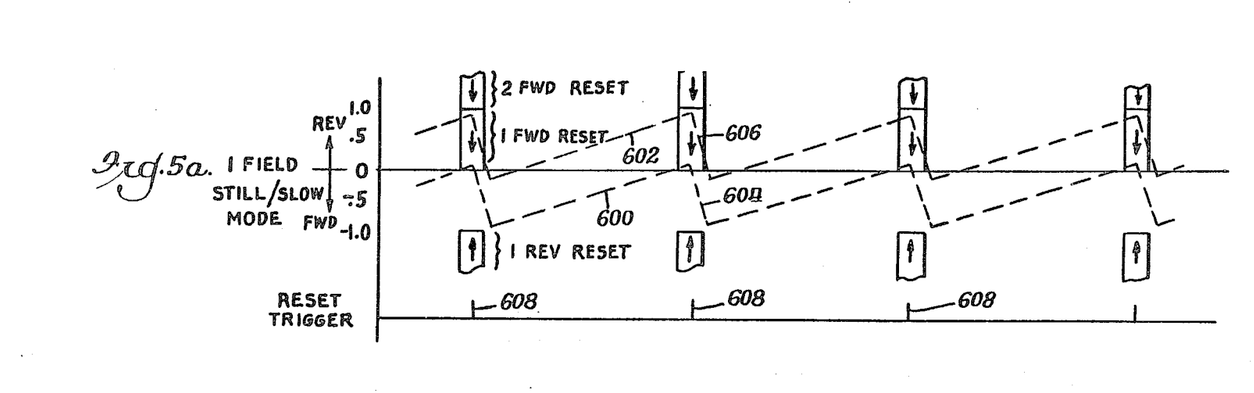
FIG. 5a is a diagram of time versus amplitude of the head deflection waveform for a slow motion operation and illustrates the operation of circuitry disclosed herein when the recording and reproducing apparatus is placed in a one field still frame reproducing mode.
Figure 5B:
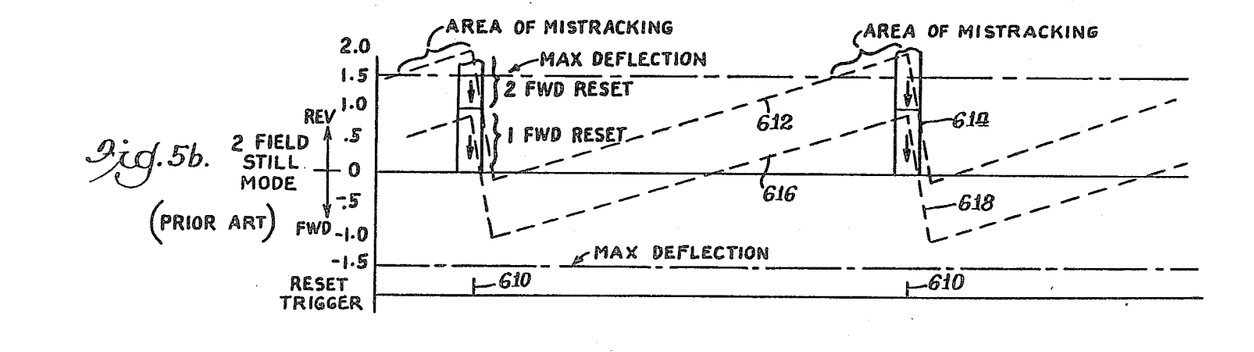
FIG. 5b is a diagram of time versus amplitude of the head deflection waveform for a two field still frame reproducing operation illustrating the operation of the circuitry embodied in the prior art U.S. Pat. No. 4,163,993.
Figure 5C:
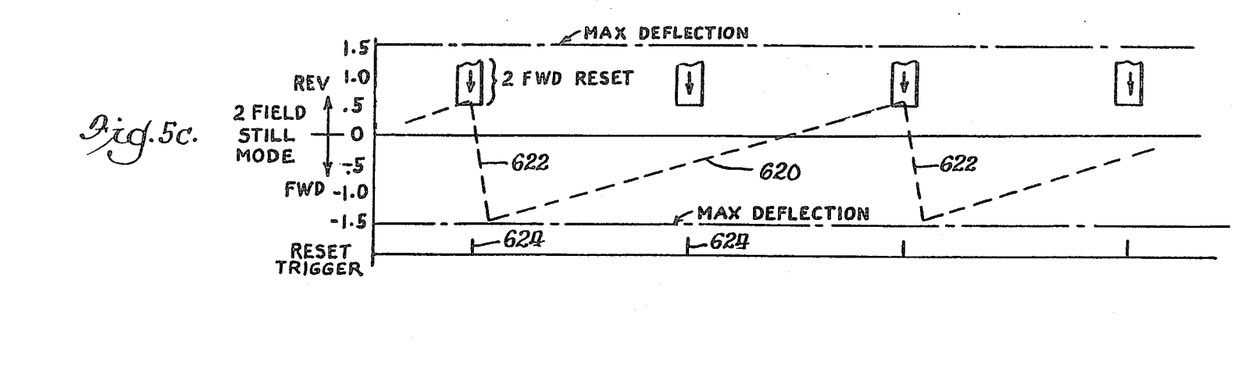
FIG. 5c is a diagram of time versus amplitude of the head deflection waveform for a two field still frame reproducing operation illustrating the operation of the circuitry embodying the present invention.

Before describing the operation of the circuitry shown in the block diagram of FIG. 1, reference is made to the time versus displacement waveforms of FIG. 5, which illustrate the operational characteristics of the apparatus during the one field still frame reproducing mode (shown in FIG. 5a), the two field still frame reproducing mode as accomplished by the particular apparatus shown in U.S. Pat. No. 4,163,993 (shown in FIG. 5b) and the operational characteristics of the present invention (shown in FIG. 5c).

In each of these FIGS. 5a through 5c, there is shown a zero base line which represents the home position or nominal position of the movable element which corresponds to its undeflected position, i.e., that position shown in FIG. 3. The vertical markings represent distances perpendicular to the length of a track relative to the nominal position in directions having a component either in a reverse or forward direction of tape transport, with 0.5 representing one half the distance d between adjacent track centers measured in the direction perpendicular to track length, 1.0 representing a full distance d, etc. The distance d is referred to herein as track-to-track spacing. The plus and minus markings represent the directions of the distances relative to the nominal position in the reverse and forward directions, respectively, of tape transport, as illustrated.

Thus, in FIG. 5a, the dotted representations reflect one field still frame reproducing wherein upwardly directly ramp portions 600 and 602 represent that portion of the scan of a track where the transducing head is being deflected in the reverse direction so as to maintain track registry thereof to obtain quality reproducing that is achieved through accurate tracking. The downwardly inclined portions 604 and 606 represent a reset movement by an amound d to reposition the transducing head to again follow the track during a subsequent revolution of the tape guide drum 22. Thus as shown, the head will be ramped upwardly (reverse) to follow a track and be downwardly reset (forward) to again begin following the track and this operation continues indefinitely to obtain a continuous video image of a single field. As is shown in the lower portion of FIG. 5a, there is a reset trigger pulse 608 which occurs at the end of a scan of each track and the transducing head is reset if the deflection of the movable element 32 exceeds a monitored threshold value at the time of the reset trigger 608. Thus as shown in FIG. 5a, threshold monitoring means monitor the position of the movable element and provide a single forward direction reset of the movable element and transducing head if the head is located between the zero and one track level in the reverse direction at the occurrence of the reset trigger 608. As is also evident from the drawing, if the head exceeds the one track level in the reverse direction at the time of the reset trigger, a double magnitude forward reset is accomplished. Similarly, if the head were in a position below the −1.0 position in the forward direction, then a reverse reset will be accomplished. The amount of the reset is either one or two distances d which represent the distance between the centers of adjacent tracks, i.e., a track-to-track spacing distance d.

It should be appreciated that when the apparatus is placed in the still frame mode, the tape is stopped and the transducing head will be following a track during the stopping of the tape. When the tape has been stopped, the dynamic range of the movable element may be such that it is in the upper portion of the range such as is shown by the dashed representation of 602 and 606 or it may be in the lower portion of the range as shown by the dashed representation 600 and 604. It should be understood that it may also be located intermediate between these two representations.

When the prior art apparatus disclosed in Ravizza Pat. No. 4,163,993 is placed in the two field still frame reproducing mode, the frequency of reset triggers is halved so that a reset does not occur at the completion of each track. Since it is desired to play two consecutive tracks, the reset trigger is applied to the movable element every other track and the movable element was permitted to ramp in the reverse direction for the entire interval between the applications of successive reset triggers so the head follows two consecutive tracks as is desired. As shown in FIG. 5b, the reset triggers are identified as trigger pulses 610 and two movable element displacement range dashed representations are also shown in the drawing, i.e., an upper inclined ramp portion 612 with double amplitude reset portion 614 and a lower inclined ramp portion 616 with reset portion 618.

In the apparatus shown in FIGS. 2 and 3, the movable element 32 may have a dynamic range that is restricted to a total distance of three track-to-track spacings, i.e., a distance of 1½ track-to-track spacings on either side of the nominal or zero deflection home position. While it is possible to manufacture movable elements that will have a significantly wider dynamic range, today such manufacture is significantly more expensive and difficult to achieve. Therefore, it is very desirable to utilize a movable element 32 that operates within the +1½ to −1½ track-to-track spacing dynamic range. It should be understood that if the tape is stopped so that the range of movement follows the representation illustrated by portions 616 and 618, there is no difficulty and the apparatus will operate properly inasmuch as it is relatively centered about the nominal position as is illustrated. However, it is possible for the tape to be stopped so that the head attempts to follow the path illustrated by the portions 612 and 614, which as shown has an area above the maximum deflection portion which is identified as an "area of mistracking". When such occurs, it is possible for video picture break-up to momentarily occur. This is because the drive waveform from the servo circuit may overdrive the movable element 32 into a limiting condition whereby the video head is no longer centered or even on the recorded track. The result of the mistracking is undesirable picture break-up which will remain until the servo accidentally recenters itself. Such a condition can occur as a result of the threshold levels for the single and double amplitude forward resets being maintained the same as for a single field still frame or slow motion reproducing mode.

The present invention enables the production of a displacement waveform that is automatically relatively centered within the dynamic range of the movable element and this is shown in FIG. 5c. The reset levels for resetting the movable element in the forward direction are changed so that any deflection beyond one half track in the reverse direction relative to the nominal or home position results in a double amplitude, or two track forward reset. This results in the displacement of the movable element a distance of two tracks, which provides several distinct advantages in the reproduction of time base altered effects. One advantage is the maintenance of the proper altering interlaced odd and even field sequence in reproduced interlaced-type television signals, which facilitate the synchronous reproduction of a time base altered television signal. The field sequence is maintained because the two track reset positions the head to scan a track of the same odd or even field type as that of the next track in the sequence of recorded tracks that would have been scanned if a reset had not occurred. Another advantage is the reproduction of two interlaced fields between each reset of the head, which enables the generation of a stop motion type time base altered effect with full vertical resolution. In other words, a full 525 line resolution T.V. image for a NTSC television signal, or 625 line resolution T.V. image for PAL or SECAN television signals, can be generated repetitively by the apparatus. Yet another advantage is the automatic centering of the range of movement of the movable element to within the maximum deflection dynamic range of the movable element. The automatic centering avoids the criticality in stopping the tape at a particular location as was the case with respect to that shown in FIG. 5b. In accordance with the present invention, the two track reset occurs whenever the movable element is deflected beyond a point corresponding to the established reset level, which would occur at the end of a scan of any track. Consequently, there is no need to modify the frequency of the reset trigger and, as shown in FIG. 5c, reset trigger pulses 624 occur at the end of the scan of each track. As shown by the ramp portion 620, it is clearly below the plus half track level at the end of the scan of a first track so that a reset will not occur and the transducing head will automatically scan the next successive track in the desired manner.

The operational characteristics shown in FIG. 5c are carried out by the circuitry 90 shown in the block diagram of FIG. 1. A mode control line 92 is connected to logic circuitry indicated generally at 111 and having lines 112, 114, 116, and 626 extending to respective switches 120, 122, 124, 628, and 630 and a line 118 extending to a variable reference or threshold producing circuit 126. The error detector output signal from a synchronous detector is applied via line 80 to the switches 120 and 122, only one of which can be closed at one time by operation of the logic circuitry 111. The switch 120 is connected via line 128, resistor 130 and line 132 to the negative input of an integrator 134 while the switch 122 is connected via line 136, resistor 138 and line 132 to the same integrator input. The values of the resistors 130 and 138 are different and effectively change the loop gain or compensation of the error signal on line 80 as applied to the input line 132 of the integrator 134 according to which one of the switches 120 or 122 is closed.

When the apparatus is operating in a slow motion and single field still frame mode, switch 120 is closed and the switch 122 is open so that the gain of the head track positioning servo system is increased so it can react faster, since there is more movement required of the movable element 32 carrying the transducing head 30 during this mode of operation than in many other modes. When the apparatus is placed in a normal speed mode, switch 122 is closed and switch 120 is opened so that the gain is reduced, less movement for correction being required in this mode because the transducing head 30 will normally closely follow the track. When the switch is in the single field still frame mode of operation, switch 124 is also closed to connect the D.C. voltage centering network 139 to the integrator 134. During slow motion modes of operation below one half normal speed, there is a need for connecting the centering network to the integrator 134 to prevent the integrator from swinging too far out of its normal operating range and thereby require excess time for servo acquisition after the apparatus is turned on. During the normal speed mode, the network 139 is unnecessary and therefore switch 124 brings it into operation only during the slow single field still mode of operation. Furthermore, when video is initially detected during an operating mode signified by a high logic RF PR signal on input line 123 (FIG. 6a), the logic circuit 111 functions to close switch 124 to facilitate rapid servo locking.

When the error signal is applied to the input line 132 of the integrator 134, the integrator responds by generating a signal that causes the movable element 32 to be displaced accordingly to adjust the position of the transducing head 30 so that it follows the track regardless of the speed of tape transport, provided it is within the limits of deflection of the movable element 32. The integrator 134 provides a ramp signal that has a slope which is determined by the speed of transport of the tape 36 and an average D.C. value that is determined by the D.C. or low frequency error signal that is derived from the head tracking servo circuitry. Thus, the servo error modulates the average level of the ramp as the transducing head position error changes. The output of the integrator 134 appears on line 66, which extends to a summing circuit that is in turn applied to circuitry associated with a motor drive amplifier (not shown) which controls the movable element 32. The reset pulses are summed at the input line 132 of the integrator 134 with the reset pulses being derived from a processed drum once around tach signal and selectively passed by AND gates 140, 142 and 144. The processed once around tach signal is derived from a tach pulse generated by a tachometer (not shown) operatively associated with the rotating drum 22, one tach pulse being provided for each revolution of the rotating drum and, hence, the scanning head 30. Conventional tachometer processing circuitry provides the pulse at the desired system time and of selected width.

The AND gate 140 has an output connected to line 132 via a resistor 146 and AND gate 142 has its output connected to line 132 via resistor 148. The output of AND gate 144 is connected to an inverter 150 which in turn is connected to line 132 via resistor 152. If either the AND gate 140 or AND gate 142 is activated, then a predetermined current pulse whose amplitude is determined by resistors 146 or 148 will appear on line 132 and be applied to the integrator 134 for the purpose of resetting the voltage level at the output thereof. The actuation of either the AND gate 140 or the AND gate 142 will produce a reset step in the output of the integrator 134 of predetermined value that will correspond to the proper amplitude reset step required to deflect the movable element a distance in the forward direction corresponding to the distance between the centers of adjacent tracks, i.e., one track-to-track spacing distance. If the AND gate 144 is actuated, then by virtue of the inverter 150 and resistor 152, an opposite polarity reset current pulse is produced in line 132, as compared to the polarity of the pulse from the AND gate 140 or AND gate 142. This opposite polarity pulse causes the reset of the movable element 32 in the reverse direction as is desired. If both of the AND gates 140 and 142 are activated simultaneously, a twice amplitude current pulse will appear on line 132 and be applied to the integrator 134 for the purpose of resetting the voltage level at the integrator output and, hence, the position of the movable head 30, equivalent to two track positions in the forward direction.

The output line 66 of the integrator 134 is coupled to one input of each of three level detectors 156, 158 and 160, each of which effectively monitors the instantaneous voltage on line 66 to determine if reset pulses are to be generated. The level detector 156 has its other input coupled to line 162 provided with a threshold voltage that can vary depending upon the position of the switch 628. When the switch 628 is in the position opposite that shown, the line 162 is provided with a voltage level that corresponds to a voltage level on line 66 that corresponds to a one track deflection in the reverse direction as shown in FIG. 5a. Thus, if the instantaneous voltage level on line 66 at the occurrence of the processed drum tach signal on line 182 exceeds the value of the threshold voltage on line 162, i.e., the instantaneous level is above the one track reverse threshold voltage, then a forward reset pulse will be generated. The level detector 160 has one input coupled to line 187 which is provided with a constant threshold voltage that corresponds to a deflection of one track-to-track distance from the nominal position in the forward direction, as also shown in FIG. 5a. If the instantaneous voltage level on line 66 at the occurrence of the processed drum tach signal is more negative than the value of the threshold voltage on line 187, i.e., the instantaneous level corresponds to a deflection beyond one track in the forward direction, then a reverse reset pulse will be generated. The level detector 158 has its other input coupled to a variable reference circuit 126, which provides alternative reference level signals depending upon the particular operating mode of the apparatus. In the slow motion mode and in the one field or two field still frame mode, the reference circuit generates a threshold voltage level that generates a forward reset when deflection is beyond the zero position in the reverse direction at the occurrence of the processed drum tach signal on line 182.

To generate the reset pulses, each of the level detectors 156, 158 and 160 have respective output lines 164, 166 and 168 which are respectively connected to the D input of latches 170, 172 and 174. The Q outputs of latches 170, 172 and 174 are connected via lines 176, 178 and 180 to the AND gates 140, 142 and 144, respectively. A line 182 is connected to the clock inputs of the latches 170 and 174, to latch 172 through a delay circuit and to a pulse and clock generator circuit 184. The generator circuit 184 also has an output line 186 connected to a second input of the respective gates 140, 142 and 144. The pulse derived from the processed once around tach signal is used by the circuitry 90 to trigger the pulse and clock generator circuitry 184 and to clock the latches 170, 172 and 174. In one embodiment of the apparatus described herein for a NTSC format, the tachometer processing circuit generates the processed drum tach pulse approximately 15.6 milliseconds after the occurrence of each once around drum tachometer pulse, which occurs each 16.6 milliseconds. The processed drum tach pulse occurs just prior to the beginning of the drop out interval. The reset trigger pulse is delayed approximately another 0.5 millisecond or about 16.1 milliseconds from the previous drum tach pulse. The delayed processed drum tach pulse is therefore timed to occur at the following track reset decision time, identified in FIG. 5c by the reference number 624. For a PAL or SECAM format apparatus, the drum tach pulses occur every 20 milliseconds, the processed drum tach pulse being delayed approximately 19.0 milliseconds from the previous drum tach pulse and the reset trigger being delayed approximately 19.5 milliseconds from the previous tach pulse. It is this processed drum tach pulse that clocks the latches 170, 172 and 174 to enable them to latch the condition of the outputs of the level detectors 156, 158 and 160, thereby determining whether a reset of the movable element carrying the head is required. During operation, if the instantaneous voltage on line 66 at the occurrence of the processed once around tach pulse on line 182 exceeds the particular value of the threshold voltage applied at the input of the respective level detector, the output line associated with each Q output of the level detectors whose threshold voltage is exceeded will be latched to a high logic level by the clocking action of the processed once around tach signal on line 182. When the apparatus is operating in the single field still frame reproducing mode and in the slow motion mode, the variable reference circuitry 126 provides the threshold voltage such that a forward head position reset occurs when the voltage level on line 66 exceeds the level corresponding to any head deflection in the reverse direction at the occurrence of the processed drum tach signal on line 182, as has been previously described in connection with FIG. 5a. The other levels that are generated by the circuitry 126 concern other modes of operation and switching from one mode to another, all of which are not particularly relevant to the present invention and which therefore will not be described in detail. Reference is made to the Ravizza Pat. No. 4,163,993 for a comprehensive description of this aspect of the apparatus.

In accordance with the present invention, when the apparatus is placed in a full field still frame reproducing mode so that the operational characteristics shown in FIG. 5c are carried out, the logic circuitry 111 will provide an active signal on line 626 so that the switches 628 and 630 are placed in the positions as illustrated in FIG. 1. It should also be understood that a manual switch could be used to control the level of the voltage on line 626 and an operator can merely select either one field or two field still frame reproducing mode during operation. When switch 628 is placed in the illustrated position, the threshold level on line 162 is effectively lowered from a threshold corresponding to a single track deflection of the movable element 32 in the reverse direction to a threshold corresponding to a half track deflection as is illustrated by FIG. 5c. This is accomplished by the circuitry comprised of resistors 632, 634 and 636 and line 638, which is connected to ground by movable contact 640 of the switch 628, effectively changing the voltage level of the line 162 to a lower level by placing resistor 636 in parallel with resistor 634 so as to alter the voltage divider network. When switch 628 has the contact 640 in the upper position (not shown) then resistor 636 is effectively removed from the divider comprised of resistors 632 and 634 and the threshold level will be returned to the one track deflection as is desired.

In accordance with another important aspect of the present invention, the displacement pattern shown in FIG. 5c illustrates a double amplitude forward direction reset portion 622 at the completion of the scanning of two consecutive tracks. While the level detector 156 provides a signal on line 164 which results in the latch 170 producing an output on line 176 which causes the gate 140 to be activated when a reset trigger pulse occurs on line 186, the output of the gate 140 will result in a single amplitude reset pulse in the forward direction being provided to the integrator 34 via line 132 rather than a desired double amplitude reset pulse. A double amplitude reset pulse is accomplished by both gates 140 and 142 being activated simultaneously.

Since the variable reference 126 applies a reference to the comparator 158 so that it will be activated whenever the movable element 32 goes beyond the zero position in the reverse direction, it will place a high level on the line 166 so that the latch 172 will have a high Q output on line 178 which will cause the gate 142 to operate at the occurrence of a reset trigger pulse on line 186. However, it is desired to prohibit a single amplitude reset being produced by virtue of comparator 158 operating when the movable element 32 is positioned between zero and one half track in the reverse direction at the occurrence of the processed drum tach signal, while permitting the comparator 158 to activate the D latch 172 when the position of the movable element exceeds the half track deflection location in the reverse direction when the comparator 156 provides a high output. To this end, the switch 630 prevents comparator 158 from placing a high level on the D input line 166 of latch 172 when the deflection of the movable element 32 is between zero and one half track in the reverse direction. This is accomplished by the Q output of latch 170 being applied via line 176, movable contact 642, line 644, diode 646 and line 166 to the D input of latch 172. Since the Q output of latch 170 will be low when the level on line 164 is low, the low value on line 176 will be applied to the D input of latch 172 to override the operative effect of comparator 158 and maintain latch 172 in a state that prevents it from gate enabling gate 142. However, once the comparator 156 is activated so that the D input line 164 is high, then latch 170 will produce a high value on line 176 which, due to the operation of the diode 646 will permit the comparator 158 to operate normally and provide a high level on line 166.

The output of latch 170 is "wire-ORed" to the output of comparator 158. This is possible because of the nature of the comparator 158 which preferably is of the type which has no active output pull-up device. Stated in other words, the diode 646 and switch 630 together with the lines interconnecting these components with the latches 170 and 172 merely operate to disable the normal operation of the comparator 158 when the deflection of the movable element 32 is in the range from zero to one half track deflection in the reverse direction. However, once the movable element moves to a position beyond the one half track threshold value, then both comparators 156 and 158 become operable, resulting in simultaneous activation of gates 140 and 142 to provide the double amplitude reset pulse in the forward direction as is desired.

In accordance with another aspect of the present invention, a resistor 662 and a capacitor 664 comprise a small delay, i.e., approximately 1/10 to 1 microsecond, that is provided between the clock line 182 and the clock input of the latch 172. This ensures that the level that is clocked into the latch 170 appears on its output line 176 and that this output level, which controls the level on the D input of latch 172, is present before the latch 172 is clocked. Thus, if latch 170 has a low output on line 176, the low level will be applied to the line 166 so that a low level will be clocked into the latch 172 as is desired.

The actual detailed circuitry which carries out the operation of the block diagram shown in FIG. 1 is illustrated in FIGS. 6a and 6b. The circuitry shown in FIGS. 6a and 6b illustrates the detailed circuitry that was disclosed in the Ravizza U.S. Pat. No. 4,163,993, but which includes the modifications that have been described with respect to the present invention. Since the operation of the circuitry of FIGS. 6a and 6b is substantially similar to that which is shown and described in U.S. Pat. No. 4,163,993, the entire description of it will not be contained herein and reference is made to the aforementioned patent, the description of FIGS. 10a and 10b of which are specifically incorporated by reference herein. The modifications that have been made to FIGS. 6a and 6b essentially carry out the modifications that have been described with respect to FIG. 1, but additionally include other minor modifications that will be specifically described herein. The switches 628 and 630 together with the circuitry associated therewith operate in a substantially similar manner as has been described with respect to FIG. 1 and will not therefore be repeated.

While the operation of the circuitry associated with switch 628 and 630 together with the delay of the clock applied to the latch 172 is necessary for proper operation of the apparatus of the present invention, other modifications which contribute to improved operation of the apparatus can be made, but these are not essential.

To this end and referring to FIGS. 6a and 6b the top center portion of FIG. 6a has an active high pass filter 300 which is part of the automatic scan tracking servo circuitry which maintains the transducing head on track during the scanning of the tracks. Since the reproducing of two successive tracks effectively doubles the range of movement of the movable means 32 carrying the transducing head 30, the servo system is required to drive the movable element through a larger range and must therefore work "harder". Accordingly, it is desirable to increase the gain of the servo circuit and this is accomplished by effectively reducing the value of a resistor 650. This is accomplished by placing a second resistor 652 in parallel with resistor 650. Lines 654 and 656 are connected to a switch 658 which, when line 626 is active, places a movable element 660 so that it places lines 654 and 656 in conduction with the resistor 652 and effectively places resistor 652 and 650 in parallel with one another, which increases the gain of the servo.

Referring to FIG. 6b, another switch 670 is controlled by the line 626 and has movable contact 672 in the illustrated position when line 626 is active. This switch effectively opens switch 124 to obtain more ideal tracking in this mode by disabling the voltage centering network 139. This is because the peak to peak sawtooth voltage at the output of the integrator 134 (line 66) is twice as great in the two field still frame reproducing mode. The larger amplitude swing would be detected by the string of four diodes connected in opposite polarity and reduce the D.C. range capability of the integrator 134. However, by opening switch 124, the D.C. voltage centering network is disabled as is desired.

It is also necessary to increase the time constant of the missing reset pulse detector one-shot multivibrator 347 and this is accomplished by line 666 being connected through resistor 668 to a switch 674 which is placed in the position shown when line 626 is active. With the increased time constant, the one-shot multivibrator 347 will not detect a missing reset pulse as a servo fault condition which could trigger the one-shot multivibrator 351. The actual timing is changed from 24 microseconds during one field still frame operation to approximately 74 microseconds for the two field still frame reproducing mode.

From the foregoing it should be appreciated that the preferred embodiment of the improved recording and reproducing apparatus is capable of reproducing two consecutive fields of information in a manner whereby the movable element carrying the transducing head is maintained in a relatively centered portion of its dynamic range so as to provide full frame resolution. The apparatus automatically centers the movable element within its dynamic range and thereby prevents picture break-up due to the movable element operating in a portion of the dynamic range where it reaches a limiting condition. Furthermore, the preferred embodiment is easily implemented using a minimum of additional circuit components and represents a significant operational improvement in the two field still frame reproducing mode relative to prior art recording and reproducing apparatus.

It should be understood that although preferred embodiments of the present invention have been illustrated and described, various modifications thereof will become apparent to those skilled in the art, and, accordingly, the scope of the present invention should be defined only by the appended claims and equivalents thereof. In this regard, the present invention has been described with reference to a preferred embodiment arranged to generate a stop motion type time base altered effect in which two interlaced fields are reproduced repetitively by transducing head carried by a movable element that is maintained in a relatively centered portion of its dynamic deflection range. This is achieved by generating a reset signal that is applied to the movable element to displace it a distance corresponding to that of two track-to-track spacings. The reset signal is applied whenever the movable element is at or beyond a selected position at the end of the scan of a track, which in the preferred embodiment is a displacement of one half track-to-track spacing in the reverse direction relative to the undeflected home position of the movable element having a deflection range of $+1\frac{1}{2}$ to $-1\frac{1}{2}$ track-to-track spacings. The position is selected so that movable element is at least one track-to-track spacing from the limit of its deflection range in the direction that the movable element is displaced as it follows a track and at least two track-to-track spacings from the opposite limit of its deflection range in the direction that the movable element is displaced in response to the application of the reset signal. It should be appreciated that the movable element could be repetitively reset an integral number of N track-to-track spacings greater than two, if a movable element having a greater deflection range is used to carry the transducing head. For example, a movable element having a deflection range of $+2\frac{1}{2}$ to $-2\frac{1}{2}$ track-to-track spacings would permit repetitive resets of up to four track-to-track spacings. For such applications, the apparatus would be altered to generate the required four track reset signal whenever the movable element at the end of the scan of a track was displaced to a position of one and one half track-to-track spacings in the reverse direction relative to its undeflected home position.

Therefore, to generalize on the above examples, for N equal to any integral number of track-to-track spacings over which the transducing head is repetitively deflected, the required N track reset signal will be generated when the position of the transducing head is substantially equivalent to a position of $(N-2)/2+\frac{1}{2}$ track-to-track spacings in the reverse direction relative to its undeflected home position.

Furthermore, the apparatus of the present invention can be employed to provide resets of a selected integral number of track-to-track spacings of two or more when generating other time base altered effects besides stop motion, such as slow motion, reverse motion or fast motion. When generating different time base altered effects, the distance that the movable element is displaced over the interval of a reproduction of a track differs accordingly to different speeds and directions of tape transport. For fast motion effects, the direction of such displacement is opposite that for slow and reverse motion effects. For such applications, the position of the movable head at the end of the scan of a track that is to cause the application of the desired reset signal to the movable element is selected to be a distance from the limit of its deflection range towards which the moveable element is displaced during the scan of a track which is at least equal to the distance the movable element is displaced over the interval of the scan of a track for the selected time base altered effect. In addition, the selected position must be a distance from the opposite limit of its deflection range at lease equal to the selected number of two or more track-to-track spacings that the movable element is to be reset.

The various features of the present invention are set forth in the following claims.

What is claimed is:

1. In a magnetic tape recording and reproducing machine of the type which has transducing means operatively supported by rotatable means for scanning a magnetic tape along a plurality of adjacent discrete tracks oriented at an angle relative to the lengthwise direction of the tape, the rotatable means including movable means for carrying the transducing means which are adapted to move the transducing means in either of first and second opposite directions relative to a nominal position along a path generally transverse to the tracks in response to an error correction signal being applied thereto, apparatus for repetitively reproducing two consecutive tracks while the transport of the tape is stopped, each track having a field of video information recorded thereon, said apparatus maintaining the transducing means generally centered relative to the nominal position during reproducing, said apparatus comprising:
 means for generating the error correcting signal for application to the movable means to move the transducing means generally in the first direction so that said transducing means follows said two tracks successively throughout their respective lengths;
 monitoring means responsive to the position of the transducing means means relative to said nominal position, for generating an output signal when the position of the transducing means exceeds a distance at the end of the scan of a track approximately equal to one half of a track-to-track spacing distance beyond its nominal position when moved in said first direction;
 reset means responsive to said output signal from said monitoring means for generating and applying a reset signal to said movable means following the end of a scan of a track effective to move said transducing means a distance equal to two track-to-track spacings in the second direction along said path opposite said first direction.

2. Apparatus as defined in claim 1 wherein the tape is transported in a forward direction during the recording of the video information along the tracks, and movement of said transducing means in said first direction corresponds to a transport direction opposite the forward direction of tape transport and movement of said transducing means in said second direction corresponds to the forward direction of tape transport.

3. Apparatus as defined in claim 1 wherein said monitoring means comprises:
 a first comparing means and a second comparing means, each for selectively generating said output signal to said reset means to effect generation of said reset signal for application to said movable means following the end of the scan of a track which is effective to move the transducing means a distance equal to one track-to-track spacing in a direction along said path opposite said first direction;
 said first comparing means generating said output signal when the position of said transducing means is approximately at or near said nominal position;
 said second comparing means generating said output signal when the position of said transducing means exceeds a distance approximately equal to a track-to-track spacing distance beyond said nominal position;
 means for inhibiting the generation of said output signal by said first comparing means until said second comparing means generates an output signal and for conditioning said second comparing means so that both first and second comparing means generate respective output signals when the position of said transducing means exceeds a distance approximately equal to one half of the track-to-track spacing distance beyond its nominal position when moved in said first direction, said output signals being effective to cause said reset means to generate said reset signal effective to move said transducing means said two track-to-track spacing distance.

4. Apparatus as defined in claim 3 further comprising:
 first latching means and second latching means, said first latching means and second latching means are operatively connected respectively to said first and second comparing means to receive output signals generated by said comparing means, each of said latching means for latching the output signals of said operatively connected comparing means at the end of the scan of each track, each of said latching means having an output connected to said reset means.

5. Apparatus as defined in claim 4 wherein the output of said second latching means is coupled by a diode to the output of said first comparing means to inhibit said first comparing means from generating an output signal until said second comparing means generates an output signal.

6. Apparatus as defined in claim 5 further including delay means for delaying the latching of the output signal of said first comparing means into said first latching means until a time subsequent to the output signal of said second comparing means being latched into said second latching means.

7. In a magnetic tape recording and reproducing machine of the type which has transducing means operatively supported by rotatable means for scanning a magnetic tape along a plurality of adjacent discrete tracks oriented at an acute angle relative to the lengthwise direction of the tape, each track being capable of having one field of video information recorded thereon, the rotatable means including moveable means, carrying the transducing means, for moving said transducing means in either of two opposite directions relative to a home position along a path generally transverse to the longitudinal direction of said tracks in response to an error correcting signal being applied thereto, wherein said tape is transported in a forward direction during recording of the video information along the tracks, an apparatus for providing either one or two field stop motion reproducing while moving said movable means so that the transducing means is generally centered relative to its dynamic range about its home position, said apparatus comprising:

means for switching said apparatus between one field and two field stop motion reproducing modes;

means for generating said error correcting signal for application to said movable means to have said transducing means follow said tracks while moving generally in a reverse direction opposite said forward direction;

reset means for applying a reset signal to said movable means to cause said transducing means to move in said forward direction along said path and oppositely said reverse direction by an amount equal to two track-to-track spacings so as to be in a position to again scan two consecutive tracks, said reset means being responsive to an output signal and to said switching means being in a two field stop motion reproducing mode;

monitoring means responsive to the position of said transducing means relative to said home position and to said switching means being in said two field stop motion reproducing mode for generating said output signal to said reset means to cause the generation of said reset signal when the position of said transducing means exceeds a distance approximately equal to one half of the track-to-track spacing beyond said home position in said reverse direction at the end of reproducing of each track.

8. Apparatus as defined in claim 7 wherein said switching means comprises a manually operable switch.

9. Apparatus as defined in claim 7 wherein said monitoring means comprises a first comparing means and a second comparing means, each for selectively generating said output signals to said reset means to to effect generation of said reset signal for application to said movable means following the end of the scan of a track which is effective to move the transducing means a distance equal to one track-to-track spacing in a direction along said path opposite said reverse direction when said reset signal indicates a displacement of said transducing means in a reverse direction along said path;

said first comparing means generating said output signal when the position of said transducing means is approximately at or near said home position, said second comparing means generating said output signal when the position of said transducing means exceeds a distance approximately equal to a track-to-track spacing distance beyond said home position; said means for switching including means for inhibiting the generation of said output signal by said first comparing means until said second comparing means generates an output signal and for conditioning said second comparing means so that both first and second comparing means generate respective output signals when the position of said transducing means exceeds, a distance approximately equal to one half of the track-to-track spacing distance beyond its home position when moved in said reverse direction, said output signals being effective to cause said reset means to generate said reset signal effective to move said transducing means said two track-to-track spacing distances.

10. Apparatus as defined in claim 9 further comprising first latching means and second latching means, said first latching means and second latching means are operatively connected respectively to said first and second comparing means to receive output signals generated by said comparing means, each of said latching means for latching the output signals of said comparing means at the end of the scan of each track, each of said latching means having an output connected to said reset means.

11. Apparatus as defined in claim 10 wherein the output of said second latching means is coupled by a diode to the output of said first comparing means to inhibit said first comparing means from generating an output signal until said second comparing means generates an output signal.

12. Apparatus as defined in claim 11 further including delay means for delaying the latching of the output signal of said first comparing means into said first latching means until a time subsequent to the output signal of said second means being latched into said second latching means.

13. In a magnetic tape recording and reproducing machine of the type which has transducing means operatively supported by rotatable means for scanning a magnetic tape along a plurality of adjacent discrete tracks oriented at an angle relative to the lengthwise direction of the tape, the rotatable means including movable means for carrying the transducing means which are adapted to move the transducing means in either of two opposite directions relative to a nominal position along a path generally transverse to said tracks in response to an error correcting signal being applied thereto, apparatus for reproducing two consecutive tracks repetitively while the transport of the tape is stopped, each track having a field of video information recorded thereon, said apparatus maintaining the transducing means generally centered relative to the nominal position during reproducing, said apparatus comprising:

means for generating the error correcting signal for application to said movable means to move said transducing means generally in a first direction so that said transducing means follows said two tracks successively throughout their lengths;

monitoring means responsive to the position of the transducing means relative to said nominal position for generating an output signal when the position of said transducing means exceeds a distance at the end of the scan of a track approximately equal to one half of a track-to-track spacing distance beyond its nominal position when moved in said first direction;

reset means, responsive to said output signal from said monitoring means, for generating a reset signal to said movable means following the end of a scan of a track effective to move said transducing means a distance equal to two track-to-track spacings in a second direction along said path opposite said first direction.

14. In magnetic tape recording and reproducing machine of the type which has transducing means operatively supported by rotatable means for scanning a magnetic tape along a plurality of adjacent discrete tracks oriented at an acute angle relative to the lengthwise direction of the tape, each track being capable of having one field of video information recorded thereon, the rotatable means including moveable means for carrying the transducing means which are adapted to move said transducing means in either of two opposite directions relative to a home position along a path generally transverse to the longitudinal direction of said tracks in response to an error correcting signal being applied thereto, wherein the tape is transported in a forward direction during the recording of the video information along the tracks, an apparatus for providing two field stop motion reproducing while moving said transducing means so that it is generally centered within its dynamic range about a home position, said apparatus comprising:

means for generating the error correcting signal for application to said movable means causing said transducing means to follow said tracks while moving generally in a reverse direction opposite to the forward direction;

reset means for generating a reset signal to said movable means to cause said transducing means to move in a forward direction opposite said reverse direction by an amount equal to two track-to-track spacings so as to be in a position to again scan two consecutive tracks, said reset means means being responsive to a monitoring means;

said monitoring means being responsive to the position of said transducing means relative to said home position for generating an output signal to said reset means causing the generation of the reset signal when the position of said transducing means exceeds a distance approximately equal to one half of the track-to-track spacing beyond said home position in said reverse direction at the end of reproducing of each track.

15. In a magnetic tape recording and reproducing machine of the type which has transducing means operatively supported by rotatable means for scanning a magnetic tape along a plurality of adjacent discrete tracks of recorded video information oriented at an angle relative to the lengthwise direction of the tape, the rotatable means including movable means for carrying the transducing means which are adapted to move said transducing means in either of two opposite directions relative to a nominal position along a path generally transverse to said tracks in response to an error correcting signal being applied thereto, said movement being confined between first and second limits defining a deflecting range about said nominal position, an apparatus for controlling said movable means comprising:

means for generating the error correcting signal for application to said movable means causing said movable means to move said transducing means generally in a first direction toward one of said limits so that said transducing means follows a subject track throughout its length, monitoring means responsive to the position of said transducing means relative to said nominal position when said transducing means is moved in said first direction for generating an output signal to a reset means when the position of said transducing means at the end of the scan of a track is less than a first selected distance from said one limit and is more than a second selected distance from the other of said limits, said first selected distance being at least as great as the distance the transducing means is moved in said first direction over the interval that the transducing means scans the length of one track; and said reset means, responsive to said output signal from said monitoring means, for generating a reset signal to said movable means following the end of a scan of a track, said reset signal effective to move said transducing means a distance equal to a selected integral number of track-to-track spacings in a direction along said path opposite said first direction equal to the number of consecutive tracks scanned since the application of a previous reset signal to said movable means, said integral number being at least two, said second selected distance being at least as great as the selected integral number of track-to-track spacings.

16. Apparatus as defined in claim 15 wherein a single field of video information of a two field interlaced television signal is recorded along each track, and the selected integral number of track-to-track spacings is two.

17. Apparatus as defined in claim 16 wherein the magnetic tape is stationary while the tracks are scanned by the transducing means, and the error correcting signal moves the movable means a distance of one track-to-track spacing during the scan of each track.

18. Apparatus as defined in claim 17 wherein each of the first and second deflection limits is at least equal to one and one half track-to-track spacings, and the output signal to the reset means is generated when the position of the transducing means at the end of the scan of a track is beyond its nominal position in the first direction a distance at least equal to one half track-to-track spacing.

19. In a magnetic tape recording/reproducing machine of the type having transducing means operatively supported by a rotatable means for scanning a magnetic tape along a plurality of adjacent discrete tracks oriented at an angle relative to the lengthwise direction of the tape, the rotatable means including means for moving the transducing means a limited dynamic distance in either of two opposite directions relative to a nominal position along a path generally transverse to the tracks in response to an error correcting signal being applied thereto, wherein the tape is transported in a forward direction during recording, an apparatus for providing a still frame reproducing mode wherein N consecutive tracks are reproduced repetitively, N being an integer greater than one, said apparatus comprising:

means for generating said error correcting signal such that the transducing means moves in a first transverse direction N track-to-track spacings in order to cause said transducing means to follow N consecutive tracks throughout their length;

means for generating a reset signal at the end of a scan of every track; and means for generating a reset command to said means for generating said error correcting signal causing said error correcting signal to vary such that the transducing means is moved in a second transverse direction, opposite to the first, N consecutive track-to-track spacings; wherein said reset command is generated substantially coincident with said reset signal when the position of the transducing means is greater than N track-to-track spacings away from said limited dynamic distance in said second direction.

20. An apparatus as set forth in claim 19 wherein: N is equal to 2.

21. An apparatus as set forth in claim 20 wherein: said limited dynamic distance is 1.5 track-to-track spacings in either said first or second direction and the position of said transducing means causing a reset command is greater than 0.5 track-to-track spacings in said first direction.

22. An apparatus as set forth in claim 19 wherein: movement of said transducing means in said first transverse direction will cause scanning of said transducing means in the direction opposite forward tape transport.

23. An apparatus as set forth in claim 19 wherein: movement of said transducing means in said first transverse direction will cause scanning of said transducing means in the direction of forward tape transport.

24. An apparatus as set forth in claim 19 wherein:
said reset command is generated substantially coincident with said reset signal when the position of the transducing means is greater than N track-to-track spacings away from said limited dynamic distance in said second direction and is beyond said nominal position in said first direction.

25. An apparatus as set forth in claim 19 wherein:
said limited dynamic distance is less than N track-to-track spacings.

26. In a magnetic tape recording/reproducing machine of the type having transducing means operatively supported by a rotatable means for scanning a magnetic tape along a plurality of adjacent discrete tracks oriented at an angle relative to the lengthwise direction of the tape, with said tracks having video information recorded therein while the tape is transported in a forward direction at a speed definitive of a normal velocity of tape transport, the rotatable means including movable means for moving the transducing means a limited dynamic distance in either of two opposite directions relative to a nominal position along a path generally transverse to the tracks in response to an error correcting signal being applied thereto, an apparatus for causing the transducing means to follow repetitively N consecutive tracks while the transport of the tape is stopped, N being an integer greater than one, said apparatus comprising:

first means for generating said error correcting signal to cause said movable means to move the transducing means in a first direction transverse to the tracks a distance corresponding to N track-to-track spacings and cause said transducing means to follow N consecutive tracks throughout their length; and second means for generating a reset command to said first means to vary said error correcting signal to cause said movable means to move the transducing means in a second direction, opposite to the first direction, a distance corresponding to N track-to-track spacings; said second means generates said reset command when the position of the transducing means is greater than one track-to-track spacing away from said limited dynamic distance in said first direction and greater than N track-to-track spacings away from said limited dynamic distance in said second direction.

27. An apparatus as set forth in claim 26 wherein said second means generates said reset command when the position of the transducing means is $(N-2)/2 + \frac{1}{2}$ track-to-track spacings beyond said nominal position in said first direction.

* * * * *